(12) United States Patent
Shobe et al.

(10) Patent No.: US 12,537,869 B2
(45) Date of Patent: Jan. 27, 2026

(54) SMART SERVICES PLACEMENT

(71) Applicant: Dropbox, Inc., San Francisco, CA (US)

(72) Inventors: Eric Shobe, Larkspur, CA (US); Oleg Guba, Redwood City, CA (US); Ganesh Prasad Rapolu, Mountain House, CA (US); Richard Davis, Dallas, TX (US)

(73) Assignee: Dropbox, Inc., San Francisco, CA (US)

( * ) Notice: Subject to any disclaimer, the term of this patent is extended or adjusted under 35 U.S.C. 154(b) by 55 days.

(21) Appl. No.: 18/521,557

(22) Filed: Nov. 28, 2023

(65) Prior Publication Data
US 2025/0175519 A1    May 29, 2025

(51) Int. Cl.
*H04L 67/1008*    (2022.01)
*H04L 43/0817*    (2022.01)

(52) U.S. Cl.
CPC ...... *H04L 67/1008* (2013.01); *H04L 43/0817* (2013.01)

(58) Field of Classification Search
CPC .................. H04L 67/1008; H04L 43/0817
See application file for complete search history.

(56) References Cited

U.S. PATENT DOCUMENTS

| | | | |
|---|---|---|---|
| 10,671,439 B1 * | 6/2020 | Frandzel | H04L 47/805 |
| 10,778,720 B2 | 9/2020 | Lee et al. | |
| 10,951,469 B2 | 3/2021 | Elliott, IV | |
| 11,023,353 B2 | 6/2021 | Poghosyan et al. | |
| 11,188,408 B2 | 11/2021 | Mahindru et al. | |
| 11,272,005 B1 | 3/2022 | Blaszka et al. | |
| 11,422,595 B2 | 8/2022 | Le Goff et al. | |
| 11,546,422 B2 | 1/2023 | Bartram et al. | |
| 11,558,272 B2 | 1/2023 | Ranjan et al. | |
| 11,573,838 B2 | 2/2023 | Krishnan et al. | |
| 11,610,121 B2 | 3/2023 | Teppoeva et al. | |
| 11,675,631 B2 | 6/2023 | Martins et al. | |
| 11,809,727 B1 * | 11/2023 | Tuzzolino | G11C 16/08 |
| 2006/0190602 A1 * | 8/2006 | Canali | H04L 67/63 709/226 |
| 2007/0198710 A1 * | 8/2007 | Gopalakrishnan | H04L 67/1001 709/225 |
| 2020/0097348 A1 * | 3/2020 | Mahindru | G06F 11/008 |
| 2020/0097349 A1 * | 3/2020 | Mahindru | G06F 11/0793 |
| 2020/0285546 A1 * | 9/2020 | Kraplanee | G06F 21/6245 |
| 2021/0334253 A1 * | 10/2021 | Darji | G06F 3/0653 |
| 2023/0044503 A1 | 2/2023 | Ganesan et al. | |
| 2023/0138337 A1 * | 5/2023 | Mufti | G06F 16/128 711/162 |

(Continued)

*Primary Examiner* — Benjamin M Thieu
(74) *Attorney, Agent, or Firm* — Keller Preece PLLC

(57) ABSTRACT

A system may obtain performance signals associated with at least one of a plurality of servers used in connection with performing a task. A system may provide the performance signals to a machine learning model. A system may receive as output from the machine learning model a health metric related to the at least one of the plurality of servers. A system may determine whether the health metric meets a migration condition. A system may, responsive to the health metric meeting the migration condition, initiate a reallocation of resources for performing the task, wherein the reallocation of resources includes migration of responsibility for performing the task to at least one other server of the plurality of servers.

20 Claims, 7 Drawing Sheets

(56) References Cited

U.S. PATENT DOCUMENTS

| | | | |
|---|---|---|---|
| 2023/0141749 A1* | 5/2023 | Hao .................... | G06N 3/09 |
| | | | 714/47.3 |
| 2024/0028955 A1* | 1/2024 | Harutyunyan ........... | G06N 5/04 |

* cited by examiner

SMART SERVICES PLACEMENT

TECHNICAL FIELD

The disclosed embodiments generally relate to the monitoring the health of a server or series of servers via a machine learning model to predict risks of failure for the server in order to balance the needs of system reliability and efficiency.

BACKGROUND

For servers hosting applications and other tasks, failures can amount to catastrophic events that can lower the overall availability and durability during such an event. The inability to get a clear picture on the status of various servers in a group of servers prevents a system from proactively adjusting and accommodating potential problems. Job placement does not take into account the "health" of a server during placement in addition during run-time. This is of concern especially when jobs require high consistency and reliability. Further, the traditional systems do not consider the capacity needs of the system and whether more resources are required. Waiting on a system to fail before problems are addressed is an inefficient use of resources and systems.

SUMMARY

The system gathers performance information related to one or more servers involved in performing a specific task and provides this information to a machine learning model. After receiving a health measurement for the servers from the machine learning model, the system evaluates whether the health measurement indicates a need for change, or meets a migration condition. If the system decides a change is necessary, it reallocates resources associated with the task and transfers the responsibility for performing the task to at least one different server within the group of servers. In some embodiments, the servers host SQL applications and includes leader servers and replica servers. The health metrics enable the system to determine when to proactive promote or demote servers within a region of servers. In some embodiments, the servers comprise a multi-tenant system, such as a Kubernetes cluster. The health metrics enable the system to determine job placement among the cluster's nodes.

In some embodiments, the system obtains performance signals associated with at least one of a plurality of servers used in connection with performing a task, provides the performance signals to a machine learning model; receives as output from the machine learning model a health metric related to the at least one of the plurality of servers; determines whether the health metric meets a migration condition; responsive to the health metric meeting the migration condition, initiates a reallocation of resources for performing the task, wherein the reallocation of resources includes migration of responsibility for performing the task to at least one other server of the plurality of servers.

The figures depict various example embodiments of the present technology for purposes of illustration only. One skilled in the art will readily recognize from the following description that other alternative example embodiments of the structures and methods illustrated herein may be employed without departing from the principles of the technology described herein.

DETAILED DESCRIPTION

System Overview

Figure 1:
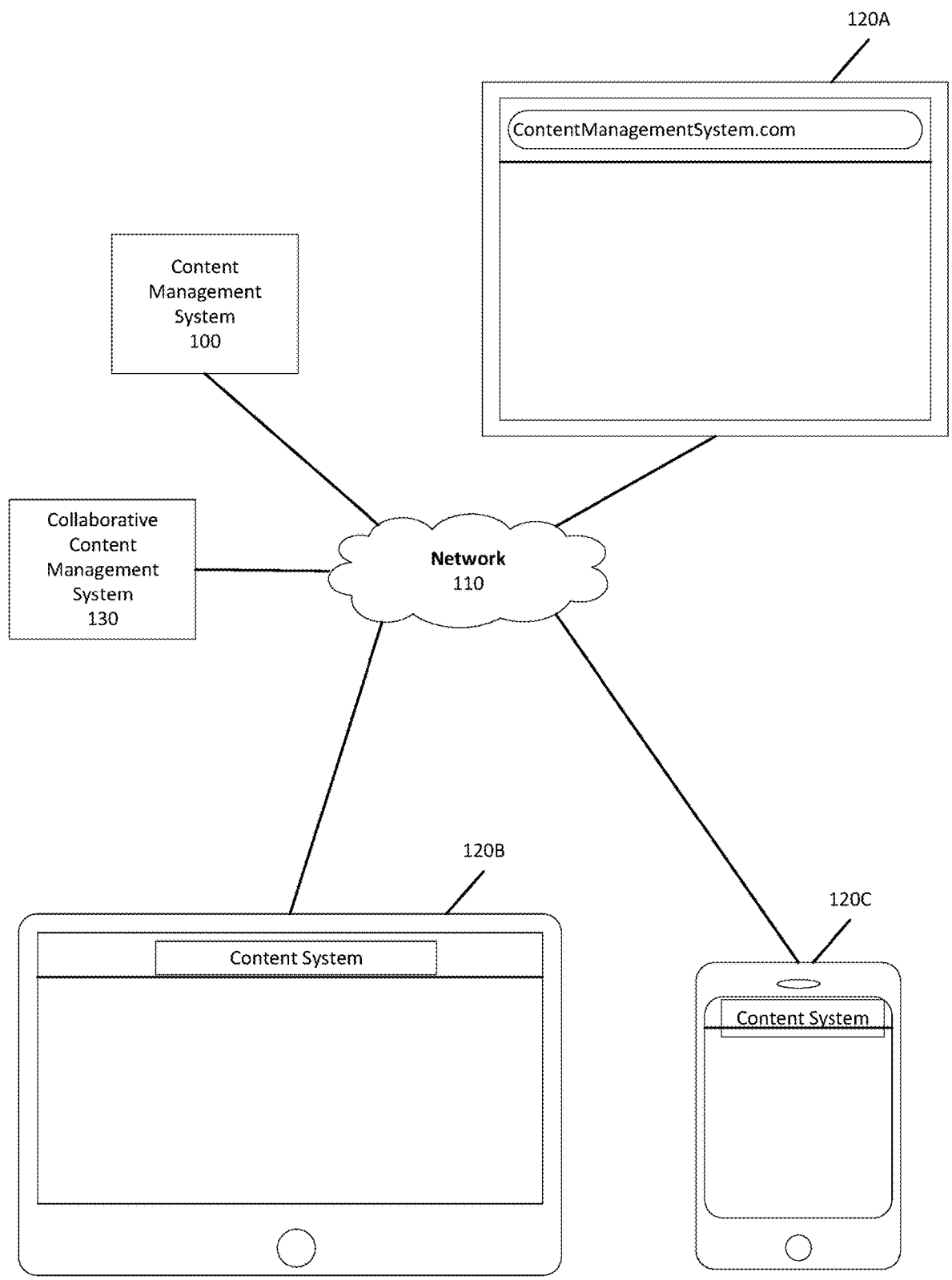
FIG. 1 shows a diagram of a system environment of a content management system and a collaborative content management system, according to example embodiments.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some example embodiments, the content stored by content management system 100 includes content items created by using third party applications, e.g., word processors, video and image editors, database management systems, spreadsheet applications, code editors, and so forth, which are independent of content management system 100.

In some example embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In some example embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some example embodiments, the entities use custom and/or dedicated data communications technologies instead of, or in addition to, the ones described above.

In some example embodiments, content management system 100 and collaborative content management system 130 are combined into a single system. The system may include one or more servers configured to provide the functionality discussed herein for the systems 100 and 130.

Client Device

Figure 2:
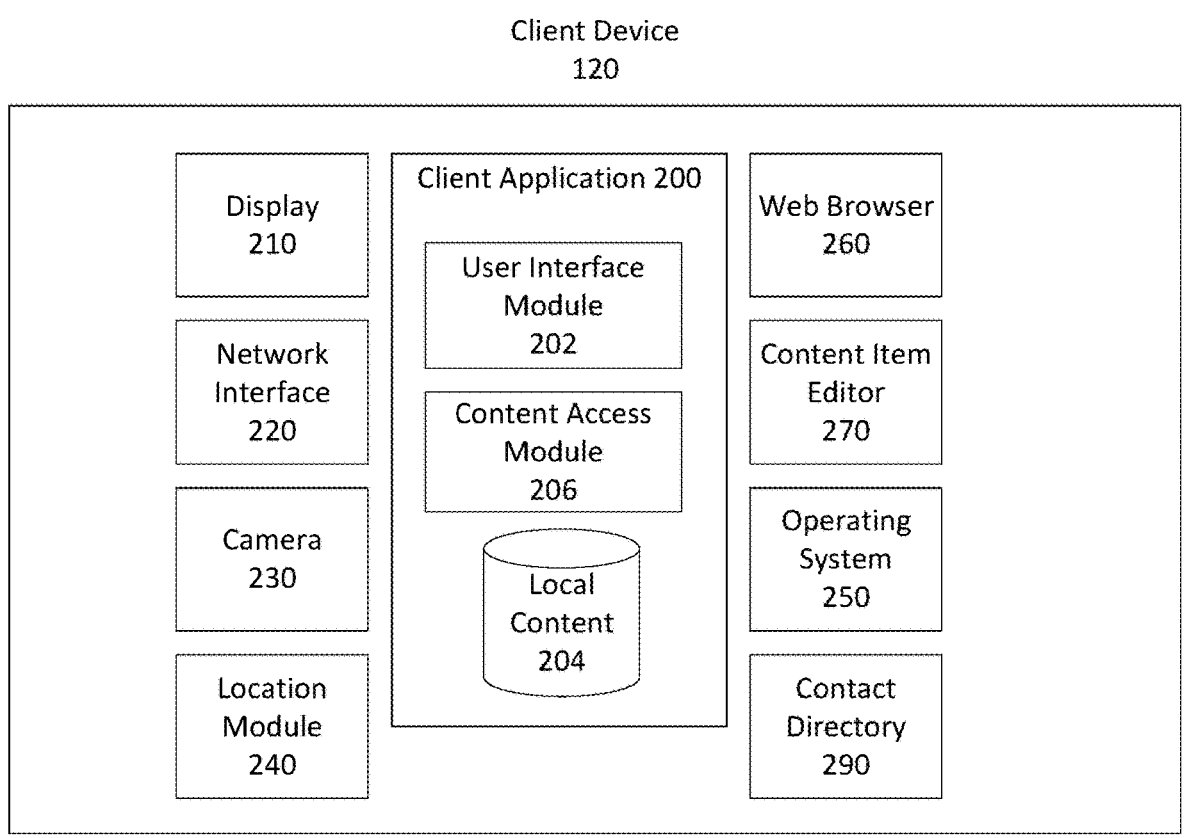
FIG. 2 shows a block diagram of components of a client device, according to example embodiments.

FIG. 2 shows a block diagram of the components of a client device 120 according to example embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain example embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
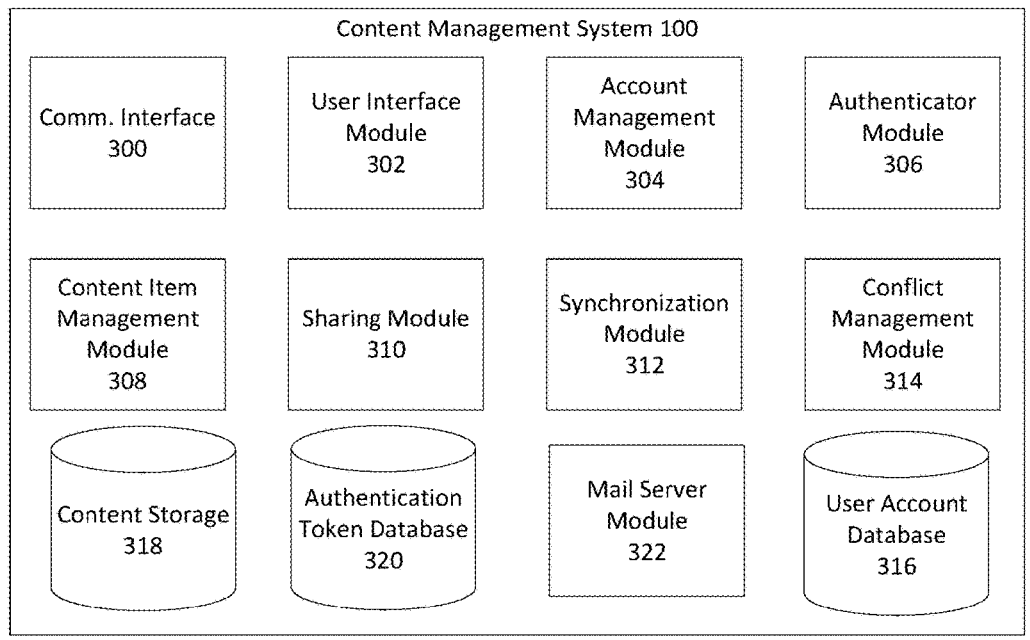
FIG. 3 shows a block diagram of a content management system, according to example embodiments.

FIG. 3 shows a block diagram of the content management system 100 according to example embodiments. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some example embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some example embodiments, the content entry includes multiple content pointers that point to multiple locations, each of which contains a portion of the content item.

In addition to a content path and content pointer, a content entry in some configurations also includes user account identifier that identifies the user account that has access to the content item. In some example embodiments, multiple user account identifiers can be associated with a single content entry indicating that the content item has shared access by the multiple user accounts.

In some example embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
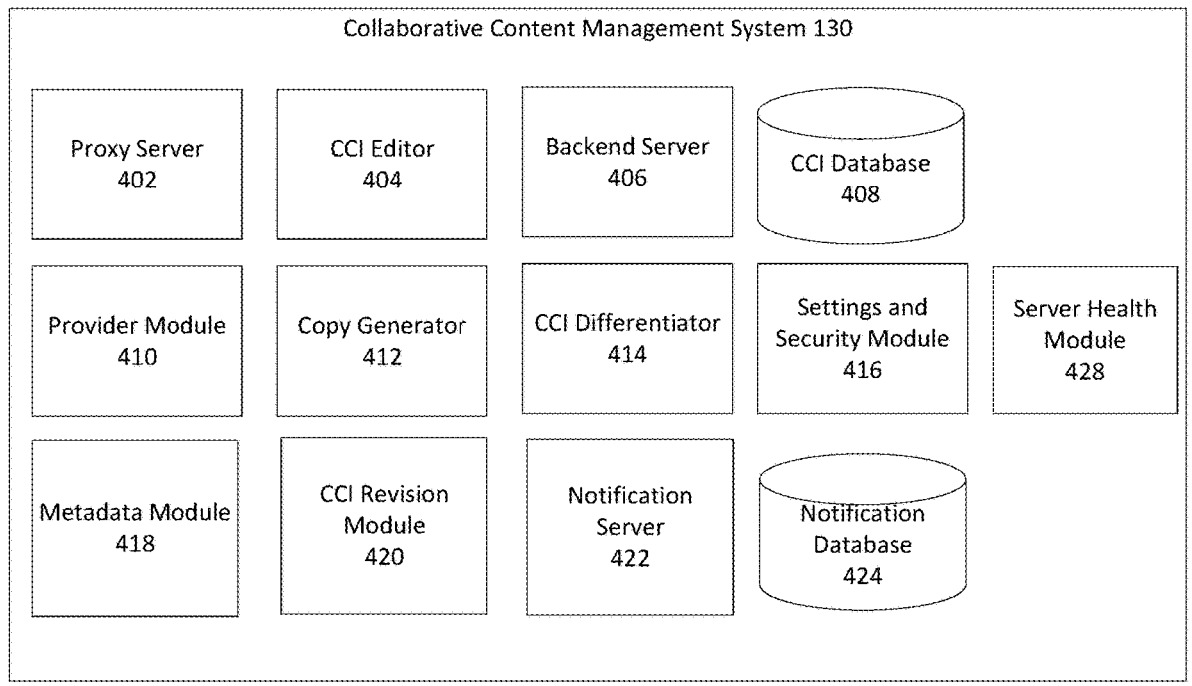
FIG. 4 shows a block diagram of a collaborative content management system, according to example embodiments.

FIG. 4 shows a block diagram of the collaborative content management system 130, according to example embodiments. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing module 310 and synchronization module 312 of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In example embodiments of FIG. 1, collaborative content management system 130 is shown as separate from content management system 100 and can communicate with it to obtain its services. In other example embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In alternative example embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some example embodiments, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In some example embodiments, the access module can also provide the access link to user accounts via the network 110, while in other example embodiments the access link can be provided or made accessible to a user account and is accessed through a user account via the client device. In some example embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received, and the user account associated with the client device requesting the copy. When the copy of the collaborative content item is generated, it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some example embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e., a differential collaborative content item. In some example embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved, or copied, or any other security similar security action. Additionally, settings and security module can access, add, edit, or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point, the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

The server health module 428 manages the monitoring of servers assigned to perform tasks, as well as the migration of tasks between the servers to ensure reliability of the server. The server health module 428 may monitor the servers that are hosting data for the content management system 100 and collaborative content management system 130, such as backend server 406 or CCI database 408. The server health module 428 may be hosted on either content management system 100 or collaborative content management system 130 and may include processes which occur on any device connected to network 110. Further details relating to operation of the server health module 428 are described below with respect to FIGS. 5-8.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Figure 5:
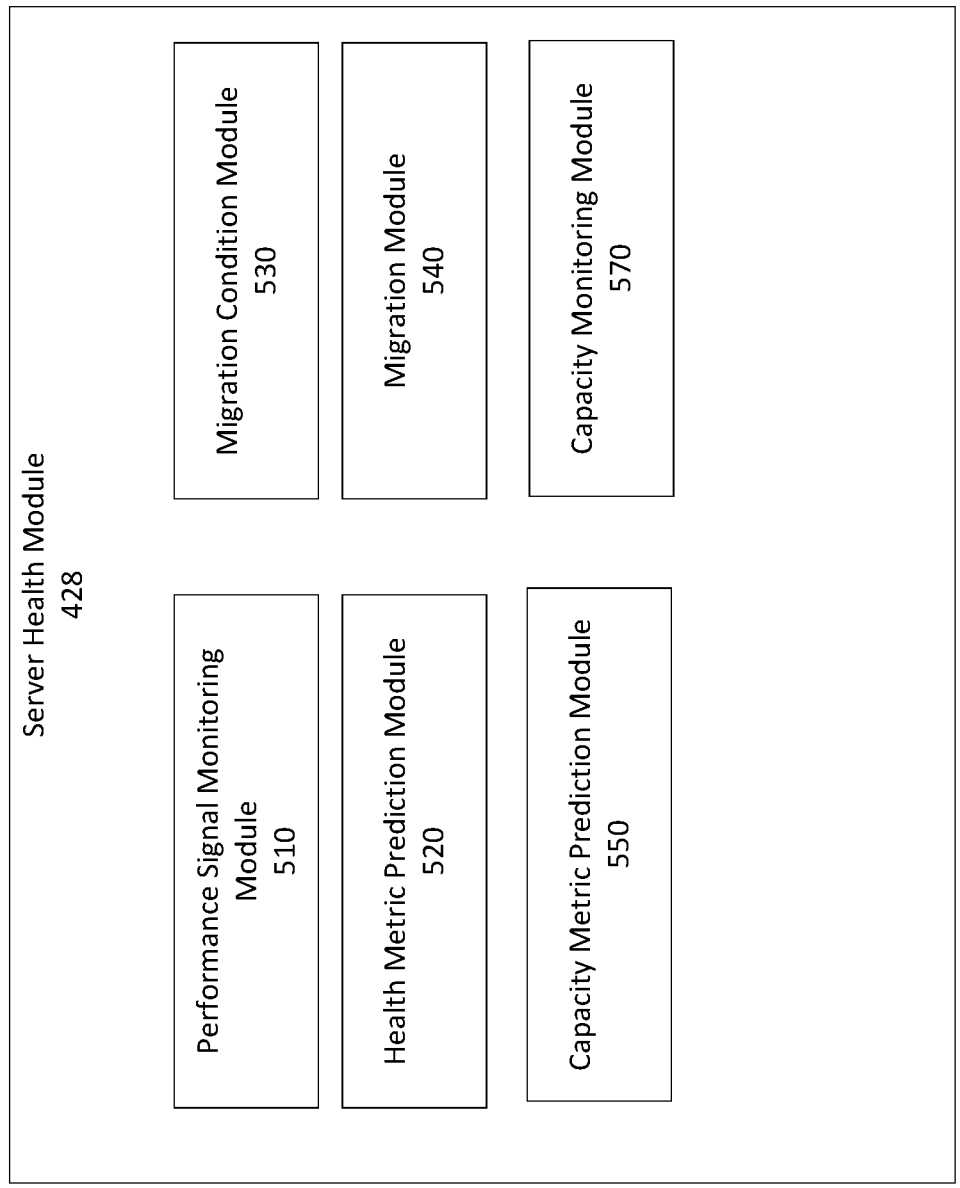
FIG. 5 shows a block diagram of a smart data placement system, according to example embodiments.

FIG. 5 shows a block diagram of a smart services placement system, according to example embodiments. FIG. 5 shows the server health module 428 and the function sub-modules within it, including a performance signal monitoring module 510, a health metric prediction module 520, a migration condition module 530, a migration module 540, a capacity metric prediction module 550, and a capacity monitoring module 570. This is just one example embodiment, and the storage health module may include fewer or more modules or a different combination of modules to achieve the functionality disclosed herein.

The performance signal monitoring module 510 obtains performance signals associated with at least one of a plurality of servers used in connection with performing a task. As used herein, the term "performance signal" may refer to any attributes, features, measurements, or variables relating to the health or the capacity of the measured component, such as a server or Kubernetes pod. Exemplary performance signals may include a series of features, variables and/or metrics describing the status of a server. As an example, the identifying features may include any combination of CPU usage, memory usage, disk space, and network usage, all of which provide essential insights into how efficiently the server handles various tasks and resources. Monitoring the system's uptime, response time, error rates, and resource utilization helps to gauge server reliability, issues that need troubleshooting, and performance optimization. These features may be represented in a vector format. The vector format allows for a convenient organization of data for using in machine learning models and process. In some embodiments, the performance signal monitoring module 510 obtains information about the task itself, such as information regarding the priority level of the task, the performance conditions required to perform the task adequately, or other information that may affect the assignment of the task to a specific server.

In some embodiments, the health metric prediction module 520 provides the performance signals to a set of one or more machine learning models and receives as output from the machine learning model(s) a health metric related to the at least one of the plurality of servers. In some embodiments, the health metric prediction module 520 may include one or more supervised machine learning models that may be trained based on previous performance signals and failures of servers to determine whether a given server is expected to fail based on its current performance. The supervised machine learning models of the health metric prediction module 520 may be trained on previous performance signals and failure rates of past servers. In some embodiments, data is gathered using S.M.A.R.T metrics or other alternate sources of measurements, along with information about when a server was de-commissioned and the age of each server. The data is cleaned to remove missing data, and fitted on a survival model to identify the variables that contribute the most predictive value to the model. Each model trained in this way is fit to a specific server system and configuration. In some embodiments, the health metric prediction module 520 provides to the machine learning model the information about the task assigned to the server.

As used herein, "survival model" refers to a statistical approach utilized to analyze the time-related occurrence of an event, specifically addressing the probability that a subject, such as the servers, survives or experiences a given event of interest over a defined period. Factors typically considered in the creation of a survival model include the performance signals which indicate the likelihood of the event and provides insights into the underlying relationships within the data, enabling predictions, planning, and effective management of risks to avoid potential hazards. The machine learning model in health metric prediction module 520 produces both survival functions (i.e., time based on probability of survival over time) and cumulative hazard functions (i.e., time-based probability of failure over time). In some embodiments, in which the plurality of servers hosts SQL applications, the survival model reflects the likelihood of failure for the server hosting the SQL application. In some embodiments, in which the plurality of servers is a Kubernetes cluster, the survival model reflects the likelihood of a node failure or a pod crashing.

The health metric prediction module 520 may calculate a health rating based on the output of the supervised machine learning model hosted by health metric prediction module 520. The health rating or health metric includes a classification of a set of a candidate classifications. For example, the candidate classifications may include a rating of a number 0 through 5, where 0 represents Low Health, and 5 represents Good Health. The health metric prediction module 520 may assign to each respective server one such rating based on the output of the supervised machine learning model hosted in the health metric prediction module 520. The output of the supervised machine learning model includes a probability that the given server is predicted to fail on that day. In some embodiments, responsive to the supervised machine learning model outputting a probability, the health metric prediction module 520 may assign health metrics based on ranges of probability. For example, an output within the range of 0-20% may receive a rating of 1 and an output within the range of 20-40% may receive a rating of 2. The ranges of probability for assigning a rating may be pre-set by an administrator. The output of the machine learning model may include information such as the predicted time window until a given server experiences failure. To include the information such as the predicted time window until a given server experiences failure, the machine learning model may be trained on data including a timeline of the server's health material over time and when the respective server failed. In this embodiment, the health metric prediction module 520 calculates the risk failure rating based on the predicted time window until a given server experiences failure, and a set policy on whether a time horizon constitutes Low Health, Poor Health, or Good Health. For example, the pre-set policy by an administrator may designate that any server with a predicted time window until failure less than 3 months is Poor Health, and that any server with a predicted time window until failure greater than 3 years to be Good Health.

The migration condition module 530 determines whether the health metric meets a migration condition. As used herein, the term "migration condition" may refer to any thresholds, risk levels, classification systems, and/or descriptions of when the responsibilities for the performance of a task needs to be moved to another server. The policies describing migration conditions are set according to pre-determined acceptable risk threshold and/or tolerance. For example, the migration condition module 530 may set the migration condition such the performance of a task needs to be migrated when a server has reached a certain risk rating. For example, for a plurality of servers hosting SQL applications, in which there is a leader server, and replica servers, the migration condition module 530 may determine when a server needs to be promoted from replica to leader, or when a server needs to be demoted from leader to server. The migration condition module 530 may predict a host failure probability and coordinate traffic in order to lower an disturbance to a user. In another example, for servers used in a multi-tenant system such as Kubernetes cluster, in which some jobs may require high consistency and reliability, the migration condition module 530 may consider when a job requires early eviction to be moved to a different node which can better suit the needs of the job. In some embodiments, the migrations conditions are associated with the task assigned to the server.

The policies for migration conditions may be pre-set based on testing of past servers and when past failures have occurred to cause problems with performance of tasks. The policies for migration conditions may be continually updated as servers are monitored and risk tolerance changes. The thresholds may also be determined based on the reliability requirements for the servers and/or the tasks performed by the servers. The server health module 428 may continue to monitor and update the failure predictions regularly. In some embodiments, tasks performed on servers have specific conditions such as a threshold for efficiency and the migration condition module 530 may evaluate the migration condition based on the performance conditions associated with the specific task to be performed on the server.

Responsive to the health metric meeting the migration condition, the migration module 540 initiates a reallocation of resources for performing the task. The reallocation of resources includes migration of responsibility for performing the task to at least one other server of the plurality of servers. The migration module 540 reallocates resources by adjusting the distribution of computing resources, such as CPU, memory, storage, and network connectivity, in response to changing workload demands or for optimizing resource utilization. In the context of a server hosting SQL applications, the migration module 540's reallocating of resources may involve the migration module 540 promotion or demoting servers from the roles of leader to replica, or replica to leader, in order to optimize the performance of the servers. In the context of a multitenant system, such as Kubernetes clusters, reallocating resources may involve horizontal scaling by adding or removing containerized application instances across nodes, redistributing workloads using load balancing mechanisms, or dynamically adjusting CPU and memory allocations for Pods based on usage patterns. The migration module 540 may reallocate resources depending on the priority of the workload. The migration module 540 may place tasks with higher priority on healthier servers or Kubernetes virtual resources depending on the embodiment.

Figure 6:
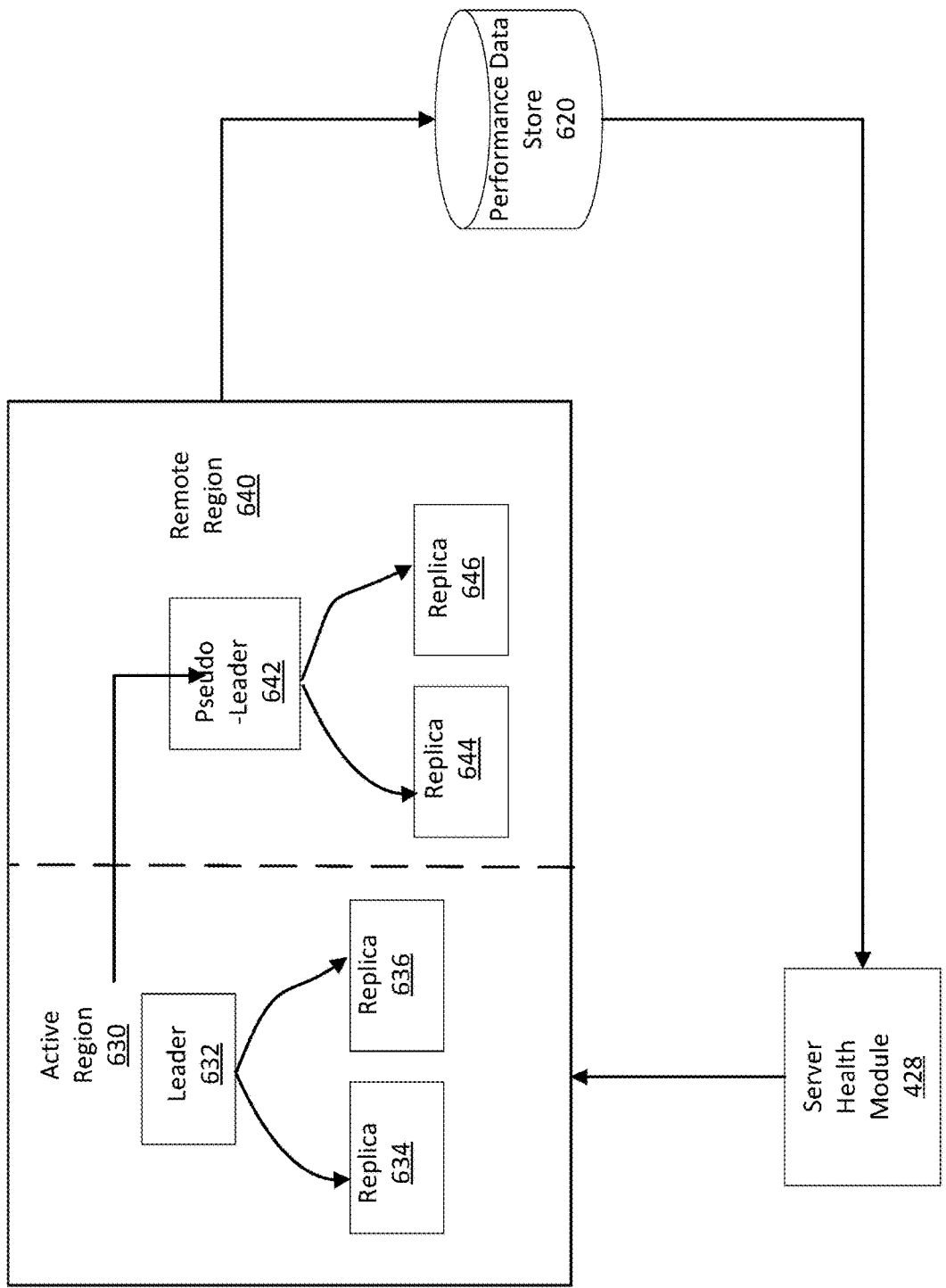
FIG. 6 shows a block diagram of a smart data placement process, according to example embodiments.
Figure 7:
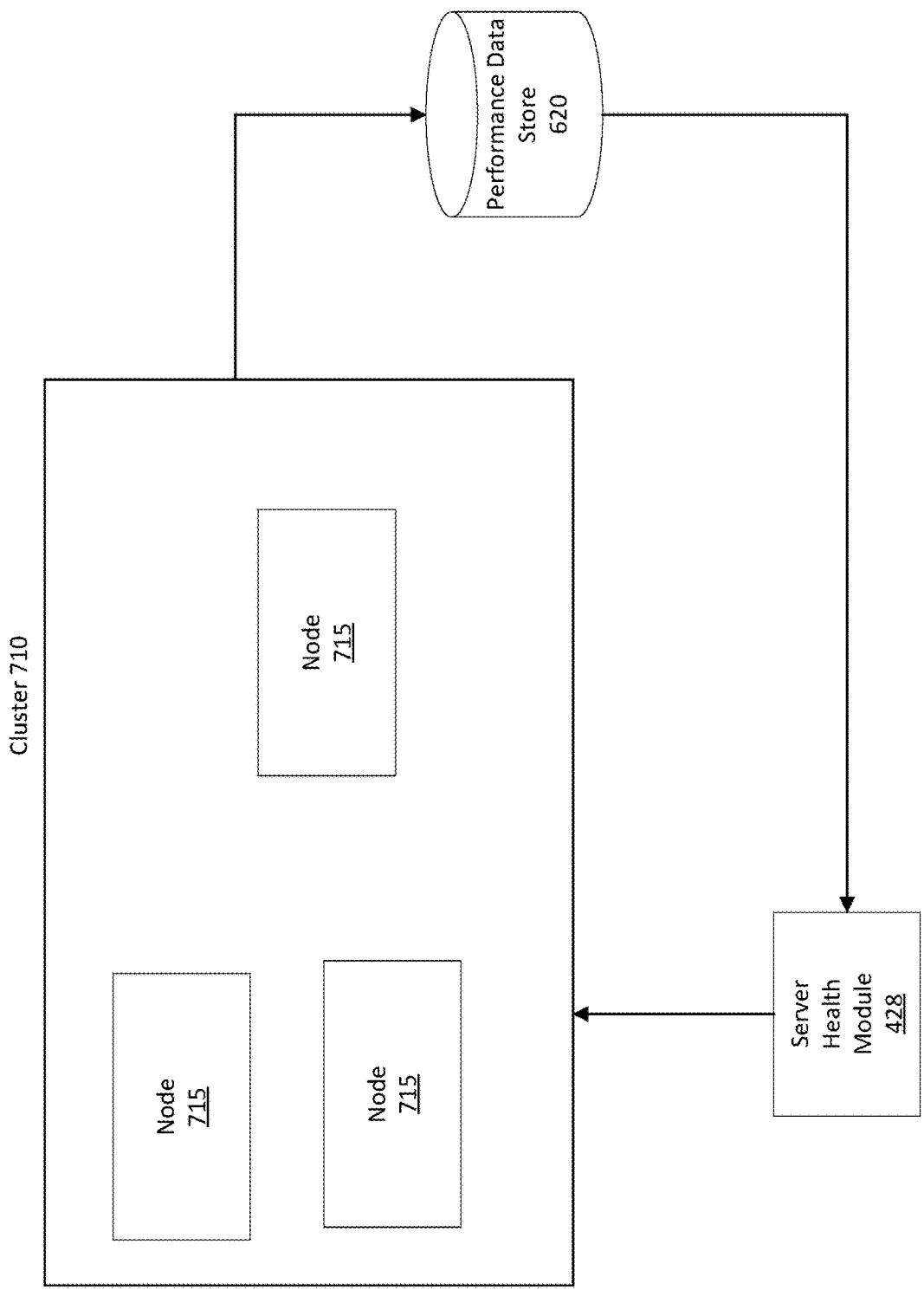
FIG. 7 shows a block diagram a block diagram illustrating a process for determine a volume failure prediction, according to example embodiments.

Briefly turning to FIGS. 6 and 7, the specifics of the migration of responsibility may vary depending on the use of the servers. FIG. 6 shows a block diagram of a smart services placement process in hosting SQL applications, according to example embodiments. The process 600 may be performed by the server health module 428, and may be performed without human intervention. The process 600 includes activities performed with respect to a fleet of servers 610 and a performance data store 620.

The fleet of servers 610 includes an active region 630 and a remote region 640 The active region includes a leader server 632, a first replica server 634, and a second replica server 636. The remote region 640 includes a pseudo-leader server 642, a third server 644, and fourth server 646. The replica servers support the associated leader server and the remote region supports the active region.

A leader server, in the context of hosting SQL applications, may be the primary server responsible for handling incoming write and read requests from clients, as well as coordinating updates and transactions across all participating servers. The leader server ensures data consistency, integrity, and synchronization. In a distributed system, the leader server plays a crucial role in decision-making and controlling the replication process. A replica server, also known as a follower or secondary server, serves as a backup in a distributed system and is primarily used for redundancy and fault tolerance. Replica servers store copies of the data and transactions managed by the leader server. Replica servers can also be engaged in handling read-only requests from clients, helping distribute the read workload and enhancing the system's overall performance. In the event of the leader server's failure, a replica server can be promoted to assume the leader's role, ensuring minimal downtime and maintaining system availability.

The performance signals associated with each of the servers within the fleet of servers 610 are monitored and stored in performance data store 620. The data store 620 may be any data storage medium connected to network 100. For alternative embodiments in which fleet of servers 610 includes solid state drives or CPUs as alternatives to servers, the metrics would adapt appropriately, with some overlap. As an example, to measure the CPU health, the performance signal may include attributes relating to temperatures, and error rate. The performance signal monitoring module 510 obtains the performance signals associated with each of the servers from performance data store 620. The health metric prediction module 520 determines a health metric for the servers of servers 610. For example, the supervised machine learning module within health metric prediction module 520 may determine that a server is health or has a high risk of failure. The health metrics and risk predictions enable the server health module 428 to predict when a promotion or demotion is needed or when a storage or host failure requires the coordination of traffic lower an disturbance from a user.

FIG. 7 shows a block diagram of a smart services placement process in a multi-tenant system, according to example embodiments. The process 600 may be performed by the server health module 428, and may be performed without human intervention. The process 600 includes activities performed with respect to a fleet of servers 610 and a performance data store 620.

The cluster 710 is a multi-tenant system, such as a Kubernetes cluster, which utilizes a cluster architecture, comprising multiple virtual or physical nodes 715 that provide computing resources. Within these nodes, individual containers house separate application components, independently and securely. An application or task may have specific performance requirements—such as high efficiency or reliability. The performance signals associated with the cluster 710 and the node 715 are monitored and stored in performance data store 620. Through the use of health metrics, the server health module 428 employs smarter job placement in addition to early eviction for jobs that require high consistency and reliability by predicting and assigning a risk score during job placement. Further, the server health module 428 may evict jobs on a host that is predicted to fail or if it is becoming prone to silent data errors or inconsistencies.

Returning to FIG. 5, the capacity metric prediction module 550 provides the performance signals related to the servers to a second machine learning model and receives as output a capacity metric associated with servers. In some embodiments, the capacity metric prediction module 550 also provides to the second machine learning model the health metric related to the servers in order to determine whether the health of a server might affect current or future capacity needs. As used herein, the term "capacity" may refer to the ability of a server to handle and execute incoming requests and tasks, contingent upon the computational resources available. These resources include, but are not limited to, processing power (CPU), memory (RAM), storage, and network connectivity. Measuring server capacity helps identify the point at which the available resources may no longer adequately address the demand placed by tasks or user requests. In some embodiments, such as in a plurality of servers hosting SQL applications, the capacity metric prediction module 550 determines capacity based on factors such as the requirements of the CPU and the memory availability. In other embodiments such as in a multi-tenant system, the capacity metric prediction module 550 determines capacity based on factors such as pod capacity, CPU requirements, and the load balancing of the cluster. The supervised machine learning models in the capacity metric prediction module 550 is trained based on previous performance signals of servers to determine how much of the computational resources are available and whether further capacity is required. The supervised machine learning modules of the capacity metric prediction module 550 are trained on previous performance signals and failure rates of past servers. Each model trained in this way is fit to a specific server system. The capacity metric prediction module 550 may continuously monitor the metrics identified to reflect capacity, partially training the model and forecasting demand as time passed.

In one embodiment, the supervised machine learning models in the capacity metric prediction module 550 are a natural language processing (NLP)-based regression model which is independent of instance type and capable of leveraging team-provided Vortex metrics. The training of the model includes evaluating data obtained through Vortex to determine its relevance. This ensures an efficient preemptive auto-scaling solution that scales in anticipation of demand, as opposed to reacting based on pre-determined logic.

The capacity metric prediction module 550 receives a remote procedure call (RPC) request from a team expressing interest in creating an auto-scaler for a specific deployment, such as a Neptune deployment, and specifies the Vortex metrics to be used for forecasting node demand. The capacity metric prediction module 550 performs an empirical assessment to determine the correlation between the metrics, and if found to be sufficiently high, integrates the metrics into the model.

Once integrated, the capacity metric prediction module 550 continuously monitors these metrics, incrementally training the model and forecasting demand over time. The capacity metric prediction module 550 may receive an RPC request at regular intervals, such as every minute, to ascertain if auto-scaling is necessary.

The capacity metric prediction module 550 includes a functional Long Short-Term Memory (LSTM) model, proven effective in accurately forecasting node demand. The model not only identifies when auto-scaling is needed, but also determines the extent of scaling required. The subsequent stage of development incorporates a cost-efficiency and stability component, ensuring the system manages node resources without frequently adding or removing nodes.

The capacity monitoring module 570 determines that the capacity metric meets a capacity condition and responsive to the capacity metric meets the capacity condition, provides a notification that an additional resource needs to be added. For example, additional resources may include additional servers or more nodes in a cluster. As used herein, "capacity condition" refers to any thresholds, risk levels, classification systems, and/or descriptions of when an additional server or further resources are required and when current servers require more capacity. The policies describing capacity conditions are set according to pre-determined acceptable risk threshold and/or tolerance.

Figure 8:
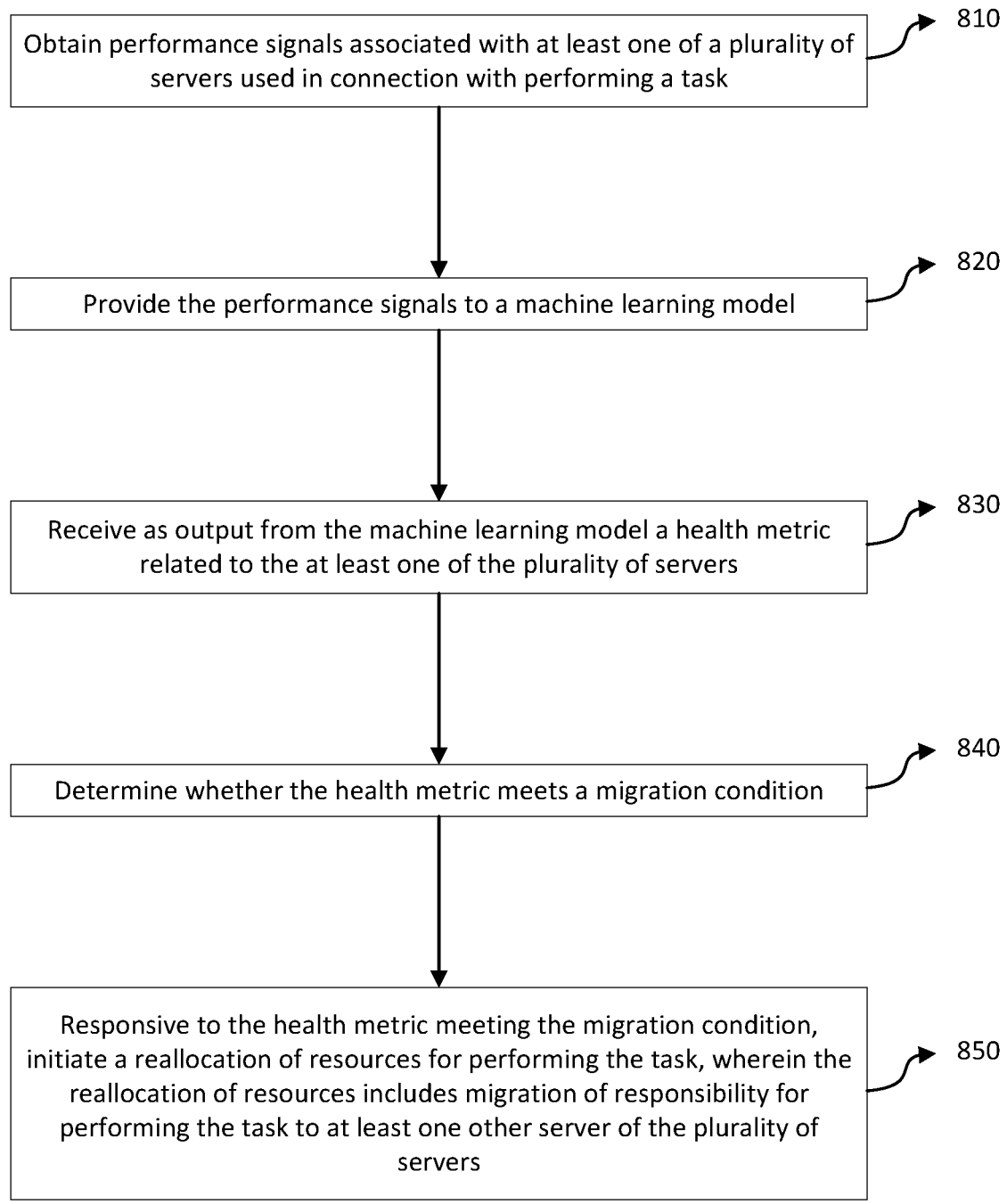
FIG. 8 shows a flow diagram of smart data placement system, according to example embodiments.

FIG. 8 shows a flowchart of an example method of a smart services placement system, according to example embodiments. The process 800 may be performed by the server health module 428, and may be performed without human intervention. FIG. 8 is a non-limiting example of some embodiments. The process 800 may occur in alternate orders and arrangements, as well as with additional or fewer steps.

The performance signal monitoring module 510 obtains 810 performance signals associated with at least one of a plurality of servers used in connection with performing a task. The health metric prediction module 520 provides 820 the performance signals to a machine learning model. The health metric prediction module 520 receives 830 as output from the machine learning model a health metric related to the at least one of the plurality of servers. The migration condition module 530 determines 840 whether the health metric meets a migration condition. Responsive to the health metric meeting the migration condition, the migration module 540 initiates 850 a reallocation of resources for performing the task, wherein the reallocation of resources includes migration of responsibility for performing the task to at least one other server of the plurality of servers.

Additional Considerations

Reference in the specification to "one embodiment" or to "example embodiments" means that a particular feature, structure, or characteristic described in connection with the example embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other example embodiments may include other modules. In addition, other example embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present technology is not described with reference to any particular programming language. It will be appreciated that a variety of programming languages may be used to implement the teachings of the present technology as described herein, and any references above to specific languages are provided for disclosure of enablement and best mode of the present technology.

While the technology has been particularly shown and described with reference to a preferred embodiment and several alternate example embodiments, it will be understood by persons skilled in the relevant art that various changes in form and details can be made therein without departing from the spirit and scope of the technology.

As used herein, the word "or" refers to any possible permutation of a set of items. Moreover, claim language reciting 'at least one of' an element or another element refers to any possible permutation of the set of elements.

Although this description includes a variety of examples and other information to explain embodiments within the scope of the appended claims, no limitation of the claims should be implied based on particular features or arrangements these examples. This disclosure includes specific example embodiments and implementations for illustration, but various modifications can be made without deviating from the scope of the example embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present technology is intended to be illustrative, but not limiting, of the scope of the technology, which is set forth in the following claims.

What is claimed is:

1. A method comprising:
    obtaining performance signals associated with at least one of a plurality of servers used in connection with performing a task of editing or creating collaborative content items;
    providing the performance signals to a machine learning model;
    receiving as output from the machine learning model a health metric related to the at least one of the plurality of servers;
    determining whether the health metric meets a migration condition, wherein the migration condition comprises a pre-determined risk threshold; and
    responsive to the health metric meeting the migration condition, initiating a reallocation of resources for performing the task, wherein the reallocation of resources includes migration of responsibility for performing the task to at least one other server of the plurality of servers.

2. The method of claim 1, wherein the plurality of servers comprises a distributed server system with an architecture of servers which includes both leader servers and follower servers.

3. The method of claim 1, wherein the health metric measures a likelihood of failure for the at least one of the plurality of servers.

4. The method of claim 1, wherein obtaining the performance signals comprises obtaining performance signals in response to receiving a notification of a failure of one of the plurality of servers.

5. The method of claim 1, wherein the plurality of servers comprises a multi-tenant system, wherein the multi-tenant system comprises a plurality of nodes, and wherein migration of responsibility for performing the task to at least one other server of the plurality of servers comprises migration of operations from one node to another node within the multi-tenant system.

6. The method of claim 5, wherein the migration condition is based on performance conditions associated with the task.

7. The method of claim 1, wherein the migration condition is based on performance conditions associated with the performance signals.

8. The method of claim 1, further comprising:
    providing the performance signals related to the at least one of the plurality of servers to a second machine learning model;
    receiving as output from the second machine learning model a capacity metric associated with the plurality of servers;
    determining that the capacity metric meets a capacity condition; and
    responsive to the capacity metric meeting the capacity condition, providing a notification that an additional server needs to be added to the plurality of servers.

9. A non-transitory computer readable medium storing instructions which, when executed by a computing system, cause the computing system to perform operations comprising:
    obtaining performance signals associated with at least one of a plurality of servers used in connection with performing a task of editing or creating collaborative content items;
    providing the performance signals to a machine learning model;
    receiving as output from the machine learning model a health metric related to the at least one of the plurality of servers;
    determining whether the health metric meets a migration condition associated with the task, wherein the migration condition comprises a pre-determined risk threshold; and
    responsive to the health metric meeting the migration condition, initiating a reallocation of resources for performing the task, wherein the reallocation of resources includes migration of responsibility for performing the task to at least one other server of the plurality of servers.

10. The non-transitory computer readable medium of claim 9, wherein the health metric measures a likelihood of failure for the at least one of the plurality of servers.

11. The non-transitory computer readable medium of claim 9, wherein the plurality of servers comprises a distributed server system with an architecture of servers which includes both leader servers and follower servers.

12. The non-transitory computer readable medium of claim 9, wherein the instructions to cause the computing system to perform operations comprising obtaining the performance signals further comprise obtaining performance signals in response to receiving a notification of a failure of one of the plurality of servers.

13. The non-transitory computer readable medium of claim 9, wherein the plurality of servers comprises a multi-tenant system, wherein the multi-tenant system comprises a plurality of nodes, and wherein migration of responsibility for performing the task to at least one other server of the plurality of servers comprises migration of operations from one node to another node within the multi-tenant system.

14. The non-transitory computer readable medium of claim 9, wherein the migration condition is based on performance conditions associated with the performance signals.

15. The non-transitory computer readable medium of claim 9, the instructions cause the computing system to perform operations further comprising:

providing the performance signals and related to the at least one of the plurality of servers to a second machine learning model;

receiving as output from the machine learning model a capacity metric associated with the plurality of servers;

determining that the capacity metric meets a capacity condition; and responsive to the capacity metric meets the capacity condition, providing a notification that an additional server needs to be added to the plurality of servers.

16. A system comprising:

memory with instructions encoded thereon; and one or more processors that, when executing the instructions, are caused to perform operations comprising:

obtaining information about a task and performance signals associated with at least one of a plurality of servers used in connection with performing the task of editing or creating collaborative content items;

providing the information about the task and the performance signals to a machine learning model;

receiving as output from the machine learning model a health metric related to the at least one of the plurality of servers;

determining whether the health metric meets a migration condition, wherein the migration condition comprises a pre-determined risk threshold; and responsive to the health metric meeting the migration condition, initiating a reallocation of resources for performing the task, wherein the reallocation of resources includes migration of responsibility for performing the task to at least one other server of the plurality of servers.

17. The system of claim 16, wherein the health metric measures a likelihood of failure for the at least one of the plurality of servers.

18. The system of claim 16, wherein the plurality of servers comprises at least one active leader server, at least one remote pseudo-leader server, at least two active replica servers, and at least two remote replica servers.

19. The system of claim 16, wherein the plurality of servers comprises a multi-tenant system, wherein the multi-tenant system comprises a plurality of nodes, and wherein migration of responsibility for performing the task to at least one other server of the plurality of servers comprises migration of operations from one node to another node within the multi-tenant system.

20. The system of claim 16, wherein the one or more processors are caused to perform operations further comprising:

providing the performance signals related to the at least one of the plurality of servers to a second machine learning model;

receiving as output from the machine learning model a capacity metric associated with the plurality of servers;

determining that the capacity metric meets a capacity condition; and responsive to the capacity metric meets the capacity condition, providing a notification that an additional server needs to be added to the plurality of servers.

\* \* \* \* \*